United States Patent [19]

F'Geppert

[11] 4,151,753

[45] May 1, 1979

[54] LOCKABLE GEAR-RACK UNIT

[75] Inventor: Erwin F'Geppert, Novi, Mich.

[73] Assignee: The United States of America as represented by the Secretary of the Army, Washington, D.C.

[21] Appl. No.: 871,161

[22] Filed: Jan. 19, 1978

[51] Int. Cl.² .............................................. F16H 19/04
[52] U.S. Cl. ........................................ 74/31; 74/411.5; 74/422; 74/530
[58] Field of Search ................. 74/530, 126, 422, 322, 74/31, 32, 33, 34, 35, 411.5; 188/163

[56] References Cited

U.S. PATENT DOCUMENTS

| 3,482,666 | 12/1969 | Case et al. | 188/163 X |
| 4,095,482 | 6/1978 | Kirshner | 74/422 X |

Primary Examiner—Benjamin W. Wyche
Assistant Examiner—Conrad L. Berman
Attorney, Agent, or Firm—Peter A. Taucher; John E. McRae; Nathan Edelberg

[57] ABSTRACT

In a pinion-rack drive system, an auxiliary lock mechanism for the movable component, said lock mechanism including a second rack normally not meshed with the pinion drive gear but potentially meshable therewith when the pinion gear is moved axially parallel to the teeth on the racks. Lock action involves axial adjustment of the pinion gear so that the gear has opposite ones of its teeth (on the gear diameter) locked in the rack teeth, thereby precluding rotation of the pinion gear and translation of the pinion gear along the rack system.

5 Claims, 5 Drawing Figures

LOCKABLE GEAR-RACK UNIT

The invention described herein may be manufactured, used, and licensed by or for the Government for governmental purposes without payment to me of any royalty thereon.

BACKGROUND AND SUMMARY OF THE INVENTION

This invention relates to a pinion-rack drive system, and especially to an auxiliary lock mechanism incorporable into the system to retain the movable element of the system in a locked condition when the pinion is inactive as a drive component. The invention is believed applicable in various fields where pinion-rack systems are used, e.g. vehicle seat adjusters, turret drive systems in military tanks, gun elevation adjusting systems in tanks or stationary platforms, lathes or similar machine tools, and jacks or hoists.

THE DRAWINGS

In military tanks it is common practice to mount the main gun in a turret that is capable of full three hundred sixty degree rotation around the turret vertical axis. An anti-friction bearing having an inside diameter of approximately six feet is interposed between the hull and turret to bear the turret-gun weight. Horizontal traverse of the turret around its central axis is usually accomplished by a pinion-rack drive system. The rack may be carried on the turret and the pinion gear carried on the hull; alternately the rack can be located on the hull and the pinion gear on the turret. The rack is a large endless toothed ring having approximately the same diameter as the aforementioned bearing. Rotational turning force applied to the pinion gear (by an electric motor or hydraulic motor) produces relatively translational motion of the gear along the rack, with consequent motion of the turret around its central axis. Prior to firing the main gun, it is necessary that the turret be locked in a precise position dictated by the fire control system. The present invention relates to a lock mechanism that has a positive action (as opposed to a frictional action), and an infinite number of lock positions. These features are advantageous in a turret-lock environment because they enable the large turret-gun mass to be accurately trained on the target prior to and during the gun firing operation.

Figure 2:
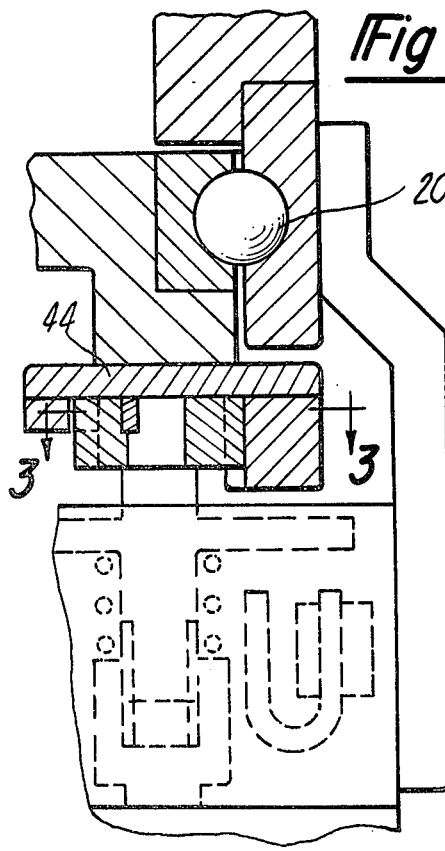
FIG. 2 is a view similar to FIG. 1, but showing the components in a locked condition.
Figure 1:
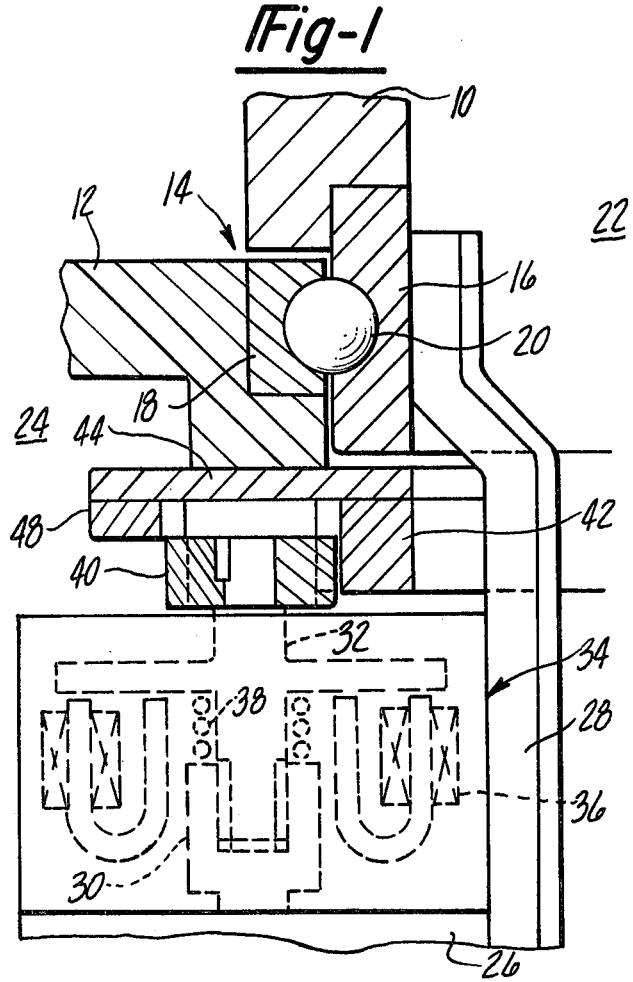
FIG. 1 is a fragmentary view through a military tank incorporating this invention.

FIGS. 1 and 2 fragmentarily illustrate a turret lock mechanism in its inactive free state (FIG. 1) and in its active state (FIG. 2). As shown in FIG. 1, the turret side wall 10 is rotatably supported on hull upper wall 12 by means of an anti-friction bearing 14, said bearing comprising an inner race 16, an outer race 18, and intervening balls 20. The space 22 to the right of bearing 14 would constitute turret space; space 24 would constitute hull space.

Power for moving the turret around its central axis is provided by a gear motor 26 suspended from the turret by means of a bracket 28. Output shaft 30 of the motor is formed with internal splines that mesh with external splines on a shaft 32 located within a clutch 34. The function of clutch 34 is to produce vertical movement of shaft 32 necessary to engage or disengage a lock mechanism that forms the subject matter of my invention. As schematically shown in FIGS. 1 and 2, the clutch includes electro-magnetic coil means 36 which when energized pulls shaft 32 downwardly to the FIG. 1 position; when coil means 36 is de-energized a spring 38 urges shaft 32 upwardly to the FIG. 2 position. Clutch 34 is preferably a commercially available device already known in the art.

Secured to the upper end of shaft 32 is a pinion gear 40 that meshes with the teeth of an endless rack 42 carried on an annular plate 44 suitably anchored to hull upper wall 12; rack 42 is concentric with the turret central axis. Assuming clutch 34 is in the engaged position (FIG. 1), operation of motor 26 produces a turning action on shafts 30 and 32, thereby rotating pinion gear 40 around its axis. The pinion gear teeth react against the teeth of rack 42, thereby translating the pinion gear along pathline 46 (FIG. 2) to produce turret rotation.

The turret is locked in adjusted positions by means of a second annular toothed rack 48 carried on plate 44 and oriented so that the teeth thereof face the teeth on rack 42. The rack teeth are spaced apart by a distance corresponding to the diameter of gear 40. When shaft 32 is urged upwardly by spring 38 to the FIG. 2 position the teeth on pinion 40 will simultaneously engage the teeth on rack 42 and rack 48. The pinion gear is thereby locked against movement along pathline 46 so that the turret is positively retained in a fixed position.

Rack 48 has an axial thickness that is substantially less than the axial thickness of rack 42. When shaft 32 is drawn downwardly by electro-magnetic coils 36 (FIG. 1) pinion 40 meshes only with rack 42. When the coil means 36 is de-energized to permit spring 38 to move shaft 32 upwardly, gear 40 simultaneously meshes with rack 42 and rack 48 (FIG. 2). The axial thickness of rack 42 is preferably equivalent to the summation of the rack 48 axial thickness and gear 40 axial thickness so that the gear 40 enjoys substantially full axial engagement with rack 42 in both positions of shaft 32. The lock action of rack 48 occurs whenever pinion gear 40 moves upwardly to the FIG. 2 position; such movement can occur in any of an infinite number of turret adjusted positions, the reason being that the teeth of racks 42 and 48 are oriented to simultaneously mesh with pinion 40. The pinion slips into the teeth on rack 48 irrespective of the position of the pinion along pathline 46.

The lock rack 48 is a positive locking device that functions best when pinion gear 40 has a relatively slow movement along pathline 46; if gear 40 is moving at a high speed on pathline 46 when the gear is moved upwardly then the gear 40 will come to an abrupt stop as its teeth slip into the teeth on rack 48. An abrupt halt of the pinion gear 40 could produce a high shock stress on the shaft 32 or associated drive system. Therefore, the lock rack 48 is not intended to function as a device for slowing the turret motion down; instead, rack 48 is intended as a device for holding the turret motionless after it has slowed down or stopped. The clutch 34 is preferably controlled so that it is de-energized after motor 26 has almost reached its stopped condition; clutch 34 is initially energized as the first step in the motor start-up operation. Suitable time delay switches can be utilized to appropriately program the clutch operation.

Figure 5:
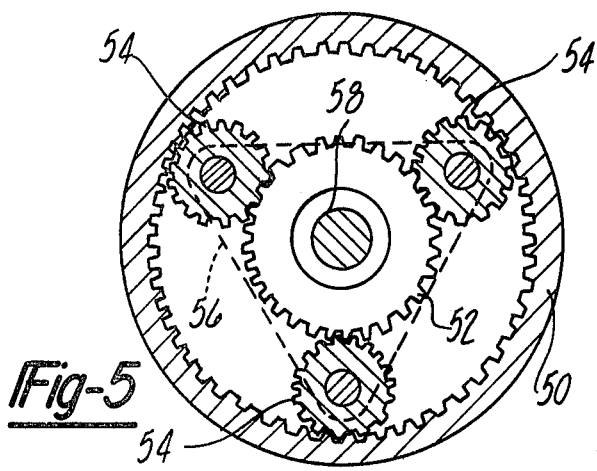
FIG. 5 is a sectional view through a planetary lock system incorporating the invention.

The system of FIGS. 1 and 2 requires a locking rack 48 of relatively large dimensions, e.g. approximately six foot ring diameter in a conventional system. FIG. 5 illustrates a planetary type lock system that can be manufactured in a relatively small size or dimension. The FIG. 5 system comprises a fixed ring gear 50, a fixed sun gear 52, and three planet gears 54, said planet gears being individually rotatably mounted on a triangular carrier plate 56 affixed to a drive shaft 58. Ring gear 50 corresponds in a functional sense to previously mentioned gear (rack) 42; accordingly gear 50 is relatively thick in the axial dimension. Sun gear 52 corresponds in a functional sense to previously mentioned gear (rack) 48; therefore gear 52 has a lesser axial dimension than gear 50. When shaft 58 is adjusted axially so that planet gears 54 mesh only with gear 50, then shaft 58 acts as a drive gear for the drive system. When shaft 58 is adjusted axially so that planet gears 54 mesh with both ring gear 50 and sun gear 52 then shaft 58 is locked against rotation.

Figure 4:
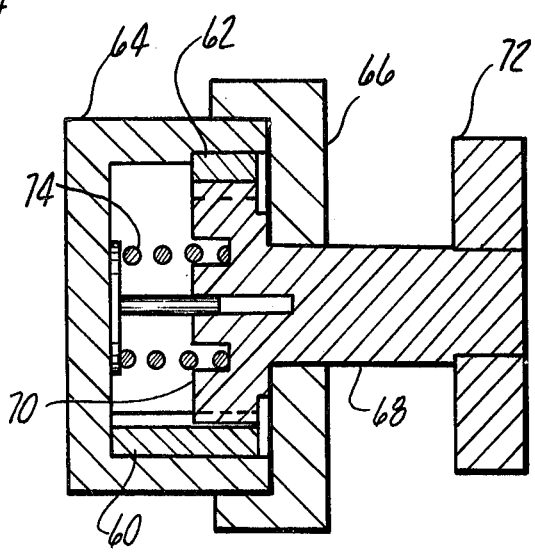
FIG. 4 is a sectional view through a vehicle seat adjuster incorporating this invention.
Figure 3:
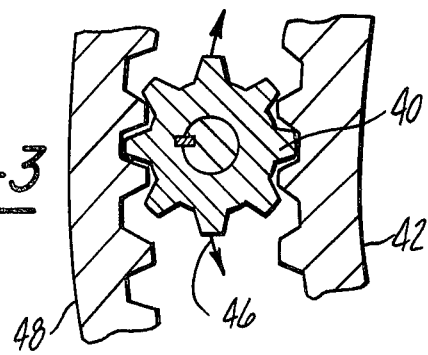
FIG. 3 is a fragmentary view taken on line 3—3 in FIG. 2.

FIG. 4 illustrates the invention applied to a rectilinear rack system. In this arrangement the full width rack 60 (corresponding to rack 42) and partial width rack 62 (corresponding to lock rack 48) are suitably mounted in a stationary channel 64. A movable channel or track 66 is suitably mounted on channel 64 for rectilinear movement normal to the plane of the paper. Track 66 carries a shaft 68 having a pinion gear 70 at its left end and a knob or handle 72 at its right end. A coil spring 74 exerts a rightward biasing force on shaft 68 to normally force gear 70 into simultaneous mesh with both rack 60 and rack 62; this action blocks track 66 against movement along channel 64. When a leftward manual force is applied on knob 72 the pinion 70 is disengaged from rack 62; a simultaneous turning motion imparted to knob 72 will cause the pinion 70 to advance track 66 along channel 64 (into or out of the plane of the paper). When the knob 72 is released, the spring 74 will automatically shift the pinion gear 70 to its illustrated position locked with racks 60 and 62.

The arrangement of FIG. 4 can be used in various manual systems wherein it is desired to automatically lock the movable component when the manual operating force is released or stopped. One use of this system would be as a seat adjuster for automotive vehicle seats; channel 64 would be a stationary guide rail, and channel 66 would be the cooperatng track attached to the underside of the seat; the human operator of the vehicle would apply axial and rotary pressure on knob 72 to adjust the seat position relative to the steering wheel. Other uses of the FIG. 4 system can be envisioned, e.g., a lathe or similar machine tool having a tool holder or fixture mounted for manual movement along a bed. Another manual system might comprise rack-pinion mechanism for elevating a military gun.

A principle advantage of the described gear lock system is its capability for locking the movable component in any one of an infinite number of adjusted positions; this infinite adjustment feature is accomplished without sacrificing the other feature of positive lock action (as opposed to mere frictional lock action). The described system is also advantageous in that the locking gear has no drag effect on the drive system during the drive operation. The drive system can be designed for low friction performance without having to build in a frictional drag force to be overcome by the prime mover. This is particularly advantageous in a military vehicle where the accessory drive system is desirably as small as possible in order to provide maximum propulsion power for greatest vehicle speed and acceleration.

I wish it to be understood that I do not desire to be limited to the exact details of construction shown and described for obvious modifications will occur to a person skilled in the art.

I claim:

1. In a rack-pinion drive system for moving one mechanism relative to an other mechanism; said system comprising a first rack carried by said one mechanism, and a pinion gear carried by said other mechanism for relative translational movement along said rack when a turning force is applied to said gear: the improvement comprising a second rack oriented on said one mechanism so that the teeth thereof face the teeth on the first rack; the teeth on the first and second racks being spaced apart by a distance corresponding to the diameter of the gear so that said gear is enabled to simultaneously engage both sets of teeth when the gear is radially aligned with both racks; and means for adjusting the gear along its axis from a first locked position radially aligned with both racks to a second unlocked position radially aligned only with the first rack.

2. The improvement of claim 1 wherein the first rack has an axial thickness at least equivalent to the summation of the second rack axial thickness and gear axial thickness, whereby the gear enjoys full axial engagement with the first rack when said gear is in its unlocked position or its locked position.

3. The improvement of claim 1 wherein said first and second racks are affixed to a common mounting plate.

4. The improvement of claim 1 wherein the adjusting means comprises a first de-energizable power means for moving the gear toward its unlocked position, and a spring means for moving the gear toward its locked position when said power means is de-energized.

5. The improvement of claim 1 wherein the stationary mechanism is the hull of a military vehicle, and the movable mechanism is a turret rotatably mounted on the hull.

* * * * *